United States Patent
Matsumoto et al.

(10) Patent No.: US 8,851,728 B2
(45) Date of Patent: *Oct. 7, 2014

(54) VEHICLE HEADLAMP

(75) Inventors: Akihiro Matsumoto, Shizuoka (JP);
Tetsuya Suzuki, Shizuoka (JP);
Tomoyuki Nakagawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/560,523

(22) Filed: Jul. 27, 2012

(65) Prior Publication Data

US 2012/0294026 A1 Nov. 22, 2012

Related U.S. Application Data

(63) Continuation of application No. 12/878,360, filed on Sep. 9, 2010, now Pat. No. 8,297,816.

(30) Foreign Application Priority Data

Oct. 5, 2009 (JP) .................................. 2009-231833

(51) Int. Cl.
*B60Q 1/04* (2006.01)
*F21V 23/00* (2006.01)
*F21S 8/10* (2006.01)
*F21Y 101/02* (2006.01)

(52) U.S. Cl.
CPC ........... *F21S 48/1104* (2013.01); *F21V 23/005* (2013.01); *F21S 48/1159* (2013.01); *F21Y 2101/02* (2013.01)
USPC ............................ 362/545; 362/517; 362/538

(58) Field of Classification Search
USPC ......... 362/464, 465, 466, 467, 507, 523, 538, 362/543, 544, 545, 516, 517
See application file for complete search history.

(56) References Cited

U.S. PATENT DOCUMENTS

| | | | |
|---|---|---|---|
| 7,654,714 B2 | 2/2010 | Mochizuki et al. | |
| 2005/0201115 A1 | 9/2005 | Ito et al. | |
| 2006/0197444 A1* | 9/2006 | Takeda et al. | 313/512 |
| 2008/0055896 A1* | 3/2008 | Feldmeier | 362/231 |
| 2008/0062709 A1 | 3/2008 | Mochizuki et al. | |
| 2008/0247182 A1* | 10/2008 | Yasuda et al. | 362/465 |
| 2009/0257240 A1* | 10/2009 | Koike | 362/538 |
| 2009/0303742 A1* | 12/2009 | Yasuda | 362/547 |

FOREIGN PATENT DOCUMENTS

| | | |
|---|---|---|
| JP | 2005-259603 A | 9/2005 |
| JP | 2008071555 A | 3/2008 |

OTHER PUBLICATIONS

Office Action Issued in Korean Application No. 10-2010-0093785, Dated Aug. 6, 2012 (9 Pages with English Translation).
Espacenet Abstract for Japanese Publication No. 2005-259603 dated Sep. 22, 2005 (2 pages).
Office Action issued in corresponding Japanese Application No. 2009-231833, mailed Sep. 12, 2013 (5 pages).

* cited by examiner

*Primary Examiner* — Laura Tso
(74) *Attorney, Agent, or Firm* — Osha Liang LLP

(57) ABSTRACT

A vehicle headlamp includes: a light-emitting module; a control circuit section for controlling a lighting of the light-emitting module; and a reflector including a reflecting face configured to reflect and collect light emitted from the light-emitting module. The control circuit section includes an opposing portion that is opposed to the reflecting face. The opposing portion is disposed at a position away from an optical path of light to be collected by the reflector.

9 Claims, 4 Drawing Sheets

VEHICLE HEADLAMP

CROSS-REFERENCE TO RELATED APPLICATIONS

This is a continuation application of U.S. patent application Ser. No. 12/878,360 filed Sep. 9, 2010.

BACKGROUND OF THE INVENTION

1. Field of the Invention

The present invention relates to a vehicle headlamp having light-emitting modules and a reflector.

2. Related Art

In recent years, technologies have been developed in which semiconductor light-emitting elements, such as LEDs (light-emitting diodes), are used as light sources of a vehicle headlamp. However, in the case that such light-emitting elements are disposed so as to be separated from a control circuit section for controlling a driving of the light-emitting elements, work for connecting wires therebetween is required. This may lead to an increase in the number of production man-hours. Consequently, for example, a light-emitting device has been proposed in which light-emitting elements and a control circuit section are mounted on the same board so that the number of wires is reduced and the reliability of the mounted components is enhanced (for example, refer to JP-A-2006-245336).

In recent years, because of demands that vehicles are made more compact and passenger compartments thereof are made larger, accordingly, demands are being made that the space occupied by vehicle headlamps be reduced. However, in the case that light-emitting elements and a control circuit section are mounted on the same board as described above, if the control circuit section is disposed close to the light-emitting elements to make a light-emitting device more compact, there occurs a danger that the control circuit section blocks the light emitted from the light-emitting elements.

SUMMARY OF THE INVENTION

One or more embodiments of the invention provide a vehicle headlamp for avoiding a situation in which an optical path of light to be used for irradiation is blocked by a control circuit section for controlling a lighting of a light-emitting module.

In accordance with one or more embodiments of a vehicle headlamp is provided with: a support board; a light-emitting module supported on the support board; a control circuit section supported on the support board and configured to control a lighting of the light-emitting module; and a reflector including a reflecting face configured to reflect and collect light emitted from the light-emitting module. The control circuit section includes, on at least a part of the control circuit section, an opposing portion that is opposed to the reflecting face. The support board is configured to support the light-emitting module and the control circuit section so that the opposing portion is disposed at a position away from an optical path of light to be collected by the reflector.

According to this structure, even in the case that the control circuit section is disposed close to the light-emitting module to the position where the control circuit section is opposed to the reflecting face of the reflector, it is possible to avoid a situation in which the optical path of the light beams to be collected by the reflector is blocked by the control circuit section. Thus, it is possible to provide a vehicle headlamp having high light use efficiency.

In the above structure, in one or more embodiments, a height of the lowest portion of a light-emitting section of the light-emitting module from a support face of the support board may be greater than a height of the highest portion of the opposing portion from the support face.

According to this structure, because a simple configuration is used in which the light-emitting module and the control circuit section are disposed at the above-mentioned positions, the opposing portion of the control circuit section can be disposed easily at a position away from the optical path.

In the above structure, the support board may be made of a heat dissipating material and configured to support the light-emitting module and the control circuit section so as to recover heat generated by the light-emitting module and the control circuit section.

According to this structure, the heat generated from the light-emitting module can be dissipated properly. Thus, temperature increase in the light-emitting module can be suppressed by the support board for supporting the light-emitting module and the control circuit section.

In the above structure, the vehicle headlamp may further include a support member that supports the support board. The support board may be secured to the support member at a plurality of locations positioned on a straight line passing through a center of a light-emitting section of the light-emitting module so that the center of the light-emitting section is positioned between said locations.

According to this structure, the support board can be prevented from floating with respect to the support member. Thus, the heat generated from the light-emitting module can be properly dissipated to the support member, and temperature increase in the light-emitting module can be further suppressed. The support board may also be made of a heat dissipating material, or another heat dissipating member made of a heat dissipating material may also be installed on the support board.

According to the structure of the above embodiments, it is possible to avoid a situation in which the optical path of light to be used for irradiation is blocked by the control circuit section for controlling the lighting of the light-emitting module.

Other aspects and advantages of the invention will be apparent from the following description and the appended claims.

DETAILED DESCRIPTION

Exemplary embodiments of the invention will be described below in detail referring to the accompanying drawings.

Figure 1:
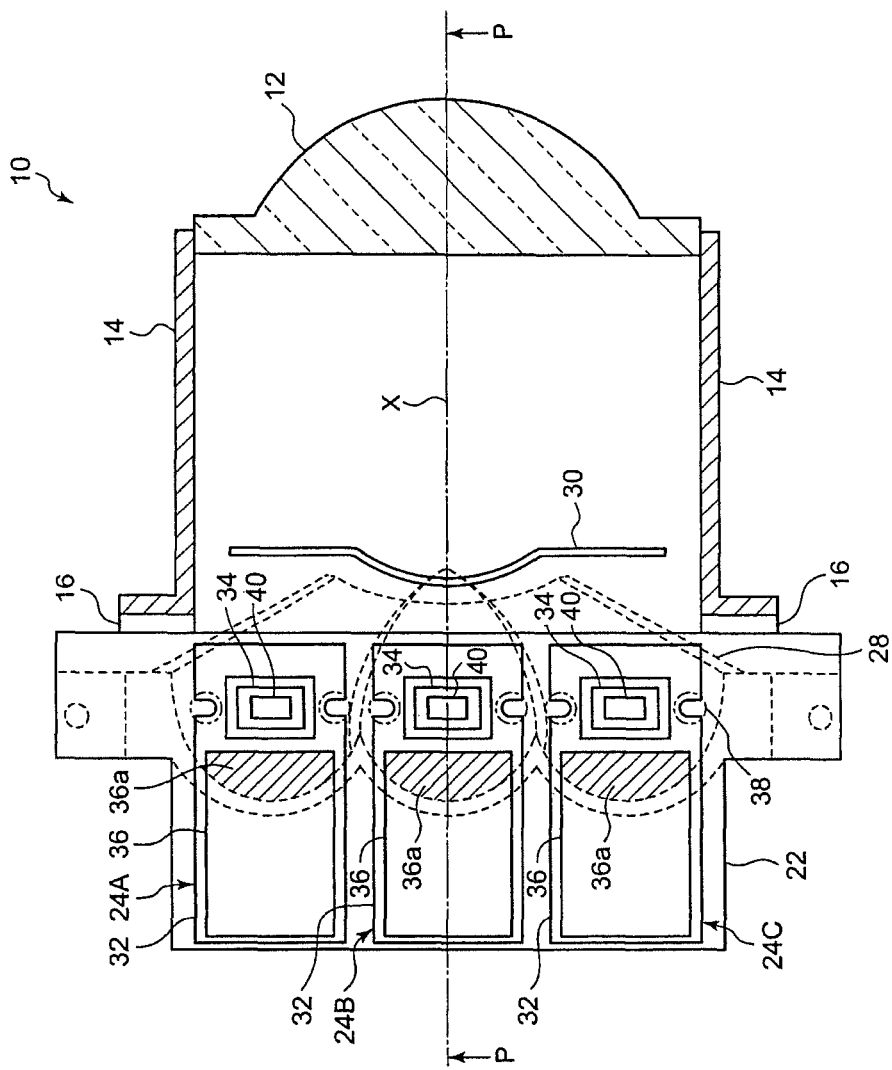
FIG. 1 is a view showing a configuration of a vehicle headlamp according to an exemplary embodiment.
Figure 2:
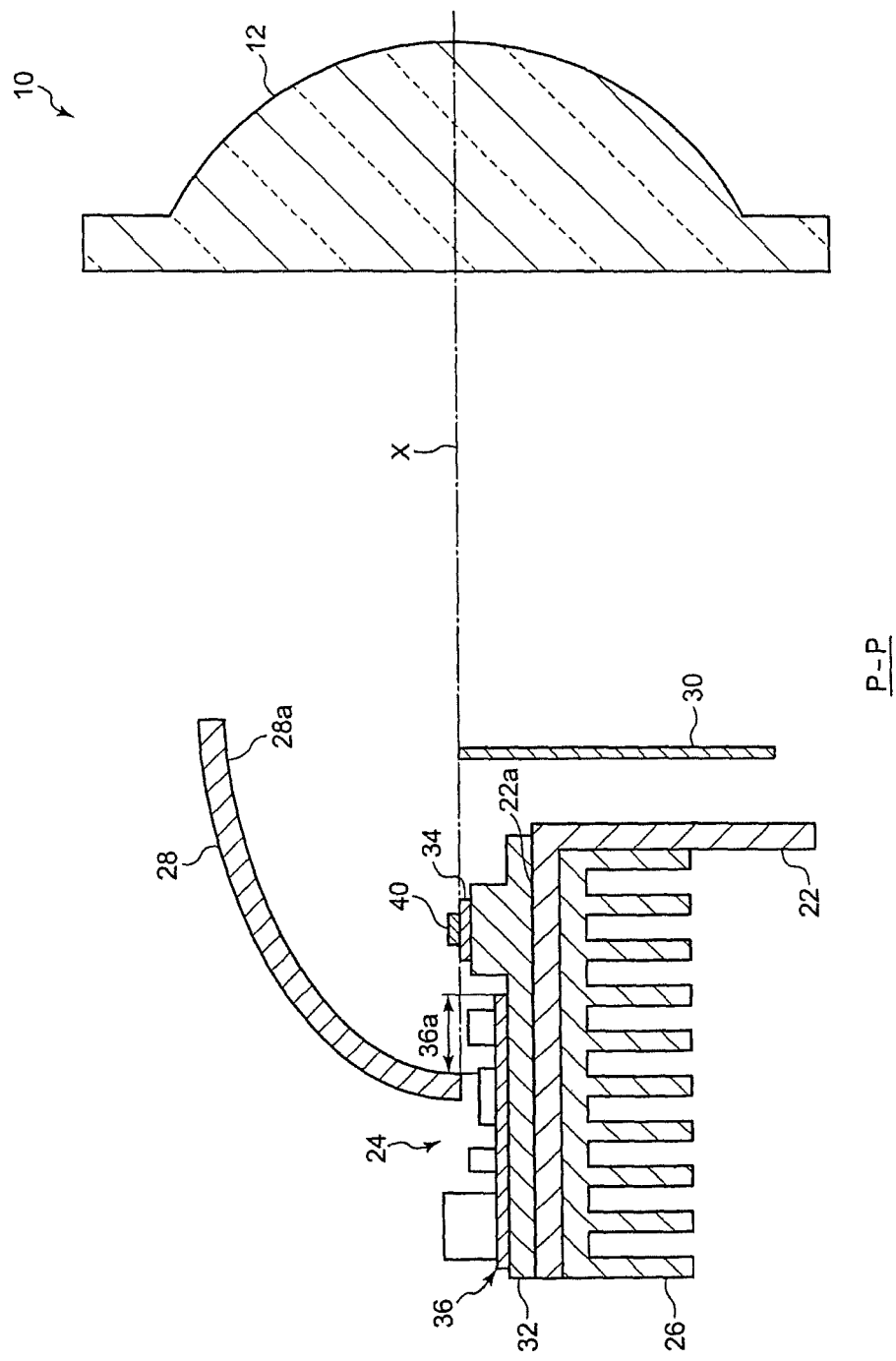
FIG. 2 is a sectional view taken on line P-P of FIG. 1.

FIG. 1 is a view showing a configuration of a vehicle headlamp 10 according to an exemplary embodiment. FIG. 2 is a sectional view taken on line P-P of FIG. 1. The configuration of the vehicle headlamp 10 will be described below referring to FIGS. 1 and 2.

The vehicle headlamp 10 has a projection lens 12, a pair of lens support members 14, a pair of plates 16, a support member 22, light-emitting devices 24, a heat sink 26, a reflector 28, and a shade 30. The projection lens 12 is formed of a plane-convex aspheric lens in which the surface on the front side is a convex face and the surface on the rear side is a plane face. A light source image formed on the rear focal plane of the lens is projected forward of the headlamp as a reverted image. The following will be described on the basis of a projected image formed on an imaginary vertical screen disposed at a position 25 meters in front of a vehicle, for example. An imaginary plane on which a projected image is supposed to be formed is not limited to such a vertical plane described above as a matter of course, but the imaginary plane may be a horizontal plane that is assumed to be a road surface, for example.

The support member 22 is formed into a shape obtained by bending a plate member into an L-shape. One outer face of the support member 22 is a horizontal upper face 22a, and the other outer face thereof is disposed so as to face forward and to be perpendicular to the optical axis X of the projection lens 12. Each of the pair of lens support members 14 is formed into a shape obtained by bending a slender metal plate into an L-shape. Each of the pair of plates 16 is formed of a slender metal plate. Both the horizontal end sections of the projection lens 12 are respectively secured to the support member 22 via the pair of lens support members 14 and the pair of plates 16.

The light-emitting device 24 has a heat dissipating board 32, a light-emitting module 34, and a control circuit section 36. Because the light-emitting module 34 and the control circuit section 36 are integrated as described above, the vehicle headlamp 10 can be made more compact than a vehicle headlamp having a configuration in which a light-emitting module is separated from a control circuit section.

The light-emitting devices 24, e.g., three in number, are provided on the upper face 22a of the support member 22 so as to be arranged in a direction perpendicular to the optical axis X. In the following descriptions, these three light-emitting devices 24 are referred to as a first light-emitting device 24A, a second light-emitting device 24B, and a third light-emitting device 24C as described from left to right when the light-emitting devices face the projection lens 12. The number of the light-emitting devices 24 provided in the vehicle headlamp 10 is not limited to three. One light-emitting device 24 or a plurality of light-emitting devices 24 in a number other than three may also be provided in the vehicle headlamp 10.

The respective light-emitting devices 24 are secured to the support member 22 with screws 38. Because the light-emitting devices 24 are secured with screws 38 that can be untightened and retightened, the light-emitting devices 24 are replaceable.

The light-emitting module 34 has a light-emitting section 40 for emitting white light and a mounting board 42. The mounting board 42 has an external shape formed into a rectangular plate shape. The light-emitting section 40 has an external shape formed into a rectangular plate shape. The light-emitting section 40 extends in a direction perpendicular to the optical axis X of the projection lens 12 and is disposed so that its lowermost portion is as high as the optical axis X.

The control circuit section 36 controls the lighting of the light-emitting module 34. The heat dissipating board 32 is made of a heat dissipating material having high thermal conductivity, e.g., aluminum, and has an external shape formed into a rectangular plate shape. In one or more embodiments, other heat dissipating materials, such as aluminum alloys, copper, copper alloys, etc., may also be used instead of aluminum.

The heat dissipating board 32 supports the light-emitting module 34 and the control circuit section 36 so as to recover the heat generated therefrom. Thus, the heat dissipating board 32 functions as a support board for supporting the light-emitting module 34 and the control circuit section 36. The control circuit section 36 is disposed on the same side of the heat dissipating board 32 on which the light-emitting section 40 is disposed.

The reflector 28 is provided so as to cover the respective light-emitting modules 34 of the three light-emitting devices 24 from above. The reflector 28 has a reflecting face 28a formed of three curved faces on the inner face thereof so as to be able to reflect and collect light emitted from the three light-emitting modules 34. Thus, the reflector 28 reflects and collects light emitted from the three light-emitting modules 34 at the reflecting face 28a.

An opposing portion 36a, part of the control circuit section 36, is disposed so as to be opposed to the reflecting face 28a of the reflector 28. Because the control circuit section 36 is disposed below the reflector 28 in the embodiment shown, the portion of the control circuit section 36 positioned below the reflecting face 28a serves as the opposing portion 36a. However, the control circuit section 36 may be disposed so that its entire structure is opposed to the reflecting face 28a of the reflector 28.

The shade 30 is formed into a plate shape and disposed between the light-emitting section 40 of the light-emitting module 34 and the protrusion lens 12. The shade 30 is disposed so that the fringe of an upper end is positioned on the rear focal plane of the protrusion lens 12. The shade 30 shields part of the light emitted from the light-emitting modules 34 and part of the light reflected by the reflector 28, thereby forming the cut-off line of a low-beam light distribution pattern described later.

The heat sink 26 is installed under the support member 22. The heat sink 26 recovers the heat generated from the light-emitting devices 24 via the support member 22 and dissipates the heat to the outside, thereby suppressing temperature increase in the light-emitting devices 24.

Figure 3:
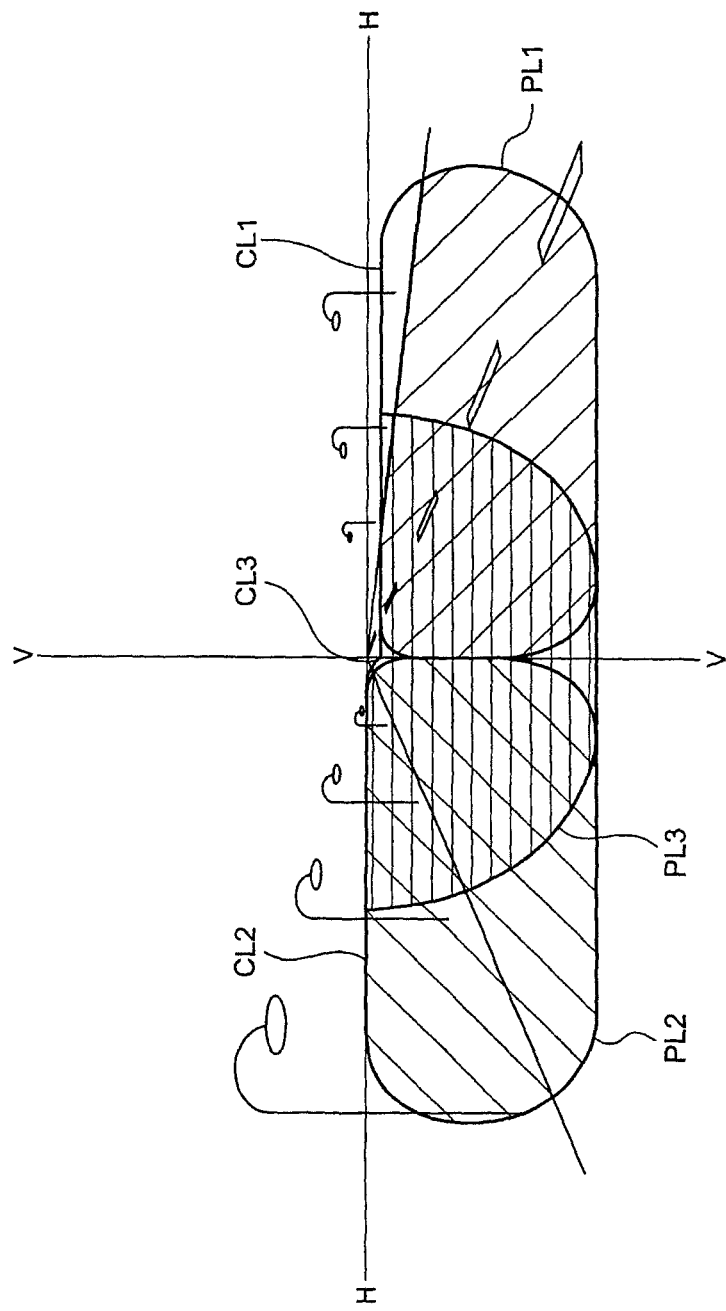
FIG. 3 is a view showing a light distribution pattern formed on an imaginary vertical screen by the vehicle headlamp according to the exemplary embodiment of FIGS. 1-3.

FIG. 3 is a view showing a light distribution pattern formed on the imaginary vertical screen by the vehicle headlamp 10 according to the embodiments as described above. The vehicle headlamp 10 is provided at each of the left front section and the right front section of a vehicle. A low-beam light distribution pattern PL is formed by the pair of vehicle headlamps 10.

The low-beam light distribution pattern PL is a low-beam light distribution pattern for left-side light distribution. The upper end fringe thereof has a first cut-off line CL1 to a third cut-off line CL3. The first cut-off line CL1 and the second cut-off line CL2 extend in the horizontal direction with a difference in level therebetween on the right side and on the left side while a vertical line V-V passing through H-V serving as a vanishing point in the front direction of the lamp is used as a boundary. The first cut-off line CL1 extends rightward in the horizontal direction from a line V-V and below a line H-H. Thus, the first cut-off line CL1 is used as an opposite-lane cut-off line. The third cut-off line CL3 extends obliquely at an inclination angle of 45° in the upper left direction from the left end of the first cutoff line CL1. The second cut-off line CL2 extends leftward along the line H-H from the intersection point of the third cut-off line CL3 and the line H-H. Thus, the second cut-off line CL2 is used as a traveling-lane cut-off line.

The low-beam light distribution pattern PL is formed of a first light distribution pattern PL1, a second light distribution pattern PL2, and a third light distribution pattern PL3. The first light distribution pattern PL1 constitutes the portion of the low-beam light distribution pattern PL on the right side of the line V-V. The first light distribution pattern PL1 is formed of the light emitted from the first light-emitting device 24A.

The second light distribution pattern PL2 constitutes the portion of the low-beam light distribution pattern PL on the left side of the line V-V. The second light distribution pattern PL2 is formed of the light emitted from the third light-emitting device 24C.

The third light distribution pattern PL3 constitutes the central portion of the low-beam light distribution pattern PL striding over the line V-V. The third light distribution pattern PL3 is formed of the light emitted from the second light-emitting device 24B.

As shown in FIG. 3, the light distribution pattern is formed using the light emitted from the plurality of light-emitting devices 24 via a single shade, i.e., the shade 30, and a single projection lens, i.e., the protrusion lens 12, as described above. Based on this configuration, the positions of the cut-off lines can be aligned accurately, and the positions of the light-emitting devices 24 can be adjusted more easily than in a case in which the shade 30 and the protrusion lens 12 are provided for each of the plurality of light-emitting devices 24.

Figure 4A:
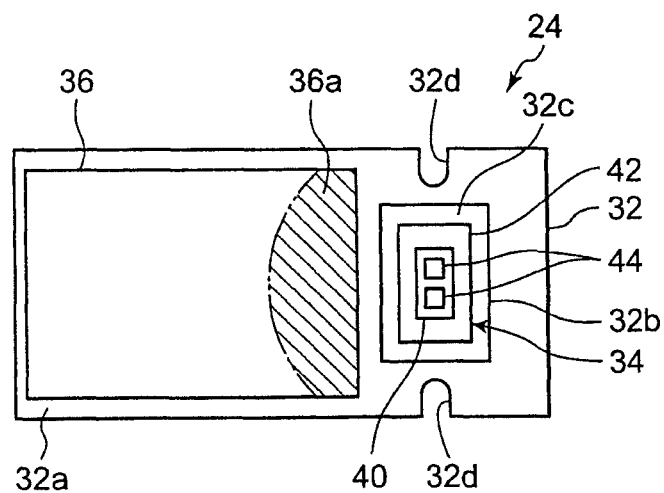
FIG. 4A is a top view showing a light-emitting device.
Figure 4B:
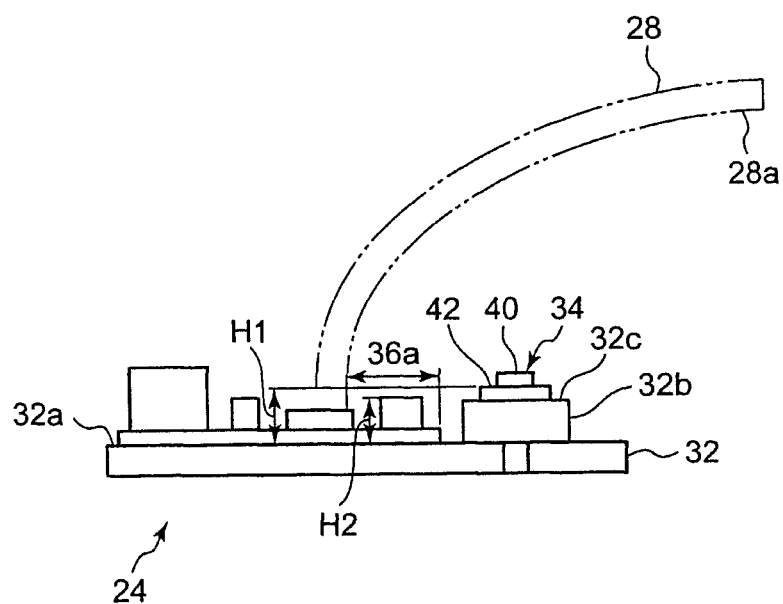
FIG. 4B is a side view showing the light-emitting device of FIG. 4A.

FIG. 4A is a top view showing the light-emitting device 24, and FIG. 4B is a side view showing the light-emitting device 24 of FIG. 4A. The specific configuration of the light-emitting device 24 in accordance with one or more embodiments will be described below referring to both FIGS. 4A and 4B.

On the first face 32a of the heat dissipating board 32, a convex portion 32b protruding upward from the first face 32a is provided near one end of the heat dissipating board 32 in the longitudinal direction thereof. The light-emitting module 34 is secured to a second face 32c that is the upper face of the convex portion 32b. The light-emitting module 34 is fixed by adhesion to the heat dissipating board 32. Also, an adhesive featuring high heat dissipation performance and having a thermal conductivity of 2.0 W/m·K or more is used.

The control circuit section 36 is placed on the first face 32a of the heat dissipating board 32. Thus, the heat dissipating board 32 supports both the light-emitting module 34 and the control circuit section 36 on the same side. That is, in other words, the heat dissipating board 32 supports both the light-emitting module 34 and the control circuit section 36 in a position above the heat dissipating board 32. The control circuit section 36 is configured such that electronic components are mounted with solder or a conductive adhesive on an alumina substrate serving as a heat dissipating material having high thermal conductivity. The control circuit section 36 is fixed to the first face 32a of the heat dissipating board 32 with an adhesive. An adhesive featuring high heat dissipation performance and having a thermal conductivity of 0.5 W/m·K or more is used.

The light-emitting section 40 has a plurality of semiconductor light-emitting elements (two in the embodiment shown) 44 for emitting white light. Each of the semiconductor light-emitting elements 44 is formed into a square shape of 1 mm on each side and has an LED. The plurality of semiconductor light-emitting elements 44 of the light-emitting section 40 are provided in parallel in a direction perpendicular to the optical axis X. The semiconductor light-emitting element 44 may have another element-like light source performing surface light emission almost equivalent to point light emission, such as a laser diode, instead of the LED. Electrodes (not shown) are provided on the upper face of the mounting board 42. The electrodes are provided to electrically connect the plurality of semiconductor light-emitting elements 44 with one another in series or in parallel.

As described above, the heat dissipating board 32 supports the light-emitting module 34 and the control circuit section 36 so as to recover the heat generated therefrom. Based on this configuration, the heat dissipated from the two units can be recovered by using a simple configuration, and the space occupied by the heat dissipating member can be reduced in comparison to a case in which a heat dissipating member is provided for each of the light-emitting module 34 and the control circuit section 36.

The components mounted on the alumina substrate are contained in the opposing portion 36a. Accordingly, if the height of the opposing portion 36a increases, there is a possibility that the optical path of the light beams to be collected by the reflector 28 and the protrusion lens 12 is blocked. For this reason, in the embodiments shown, the heat dissipating board 32 supports the light-emitting module 34 and the control circuit section 36 so that the opposing portion 36a is disposed at a position away from the optical path of the light beams to be collected by the reflector 28.

More specifically, the convex portion 32b of the heat dissipating board 32 protrudes from the first face 32a so that the height H1 of the lowest portion of the light-emitting section 40 of the light-emitting module 34 from the first face 32a serving as the support face for supporting the control circuit section 36 becomes higher than the height H2 of the highest portion of the opposing portion 36a from the first face 32a. Because the height of the opposing portion 36a is made lower than the height of the light-emitting section 40 as described above, it is possible to avoid a situation in which the opposing portion 36a located between the light-emitting section 40 and the reflecting face 28a of the reflector 28 blocks the optical path.

The heat dissipating board 32 is formed plane-symmetrically and supports the light-emitting module 34 so that the center of the light-emitting section 40 is positioned on the symmetric plane. Based on this configuration, the heat dissipating board 32 can be commonly used for the vehicle headlamp provided on the left side of a vehicle and the vehicle headlamp provided on the right side thereof.

Furthermore, the heat dissipating board 32 has a pair of securing concave portions 32d on the periphery of the convex portion 32b. Screws are threadedly engaged with threaded holes in the support member 22 so as to pass through the insides of the securing concave portions 32d, whereby the heat dissipating board 32 is secured to the support member 22.

The pair of securing concave portions 32d is positioned on a straight line passing through the center of the light-emitting section 40 and being perpendicular to the optical axis X. Thus, the heat dissipating board 32 is secured to the support member 22 at two locations positioned on a straight line passing through the center of the light-emitting section 40 of the light-emitting module 34 so that the center of the light-emitting section 40 is set between the locations. Because the securing concave portions 32d are provided at the positions described above, the heat dissipating board 32 can be prevented from floating with respect to the support member 22 at an area below the light-emitting module 34. For this reason, the heat generated from the light-emitting module 34 can be smoothly transferred to the heat sink 26 via the support member 22. In one or more embodiments, the securing concave portions 32d may also be provided on another straight line passing through the center of the light-emitting section 40.

When the heat dissipating board 32 is secured to the support member 22 with the screws, grounding conductors are led out from the screw-tightening portions and connected to the support member 22. As a result, grounding can be accomplished simultaneously when screw tightening is completed. Furthermore, in one or more embodiments, the method for securing the heat dissipating board 32 to the support member 22 is not limited to the screw tightening method. For example, in one or more embodiments, the heat dissipating board 32 may be secured to the support member 22 using rivets, clips, pins, etc.

The terminals of the control circuit section 36 are connected to the electrodes of the light-emitting module 34 using conductive members (not shown), such as bus bars and aluminum ribbons. These conductive members are connected to the electrodes of the light-emitting module 34 while passing through a routing path that is routed from the control circuit section 36 to an area that is located in front of the light-emitting module 34 in the light collection direction of the reflector 28 and while avoiding the optical path of the light beams to be collected by the reflector 28. The light collection direction of the reflector 28 is defined as a direction in which the light emitted from the light-emitting section 40 and reflected by the reflecting face 28a is directed. In the embodiments shown, the direction of the light beams being parallel with the optical axis X among the light beams reflected by the reflecting face 28a is defined as the light collection direction of the reflector 28.

More specifically, the conductive members, such as bus bars, extend downward from an area along the line connecting the reflecting face 28a of the reflector 28 to the light-emitting section 40 of the light-emitting module 34 and are routed to an area that is located in front of the light-emitting section 40 in the light collection direction of the reflector 28. The forward terminals of the conductive members in the light collection direction are connected to the electrodes of the light-emitting module 34 using other conductive members, such as aluminum ribbons. As a result, it is possible to avoid a situation in which the optical path is blocked by the conductive members that are used to connect the light-emitting module 34 to the control circuit section 36.

The present invention is not limited to the above-mentioned embodiments. Embodiments obtained by appropriately combining the various components of the above-mentioned embodiment are effective as embodiments according to the present invention. Furthermore, the above-mentioned embodiments can be subjected to modifications, such as various design changes, on the basis of the knowledge of those skilled in the art. Embodiments obtained by subjecting the above-mentioned embodiments to such modifications are also included in the scope of the present invention. Some of such embodiments are described below.

In one or more embodiments, a pair of swaging circular holes is provided instead of the pair of securing concave portions 32d. Furthermore, a pair of positioning bosses, which are formed of cylindrical convex portions and inserted into the pair of circular holes of the heat dissipating board 32, is provided on the upper face of the support member 22. First, the pair of positioning bosses is inserted into the pair of circular holes of the heat dissipating board 32. Then, the heat dissipating board 32 is placed on the support member 22, whereby the light-emitting module 34 is positioned on the heat dissipating board 32. When the light-emitting module 34 is placed on the heat dissipating board 32 using an automatic mounting machine, the positioning bosses are recognized using the automatic recognition function of the automatic mounting machine, whereby the light-emitting module 34 can be placed easily on the heat dissipating board 32.

Next, the pair of positioning bosses is swaged, whereby the heat dissipating board 32 is secured to the support member 22. Because the heat dissipating board 32 is secured to the support member 22 by swaging as described above, the amounts of portions protruding from the heat dissipating board 32 can be reduced. As a result, a situation in which the optical path is blocked by the securing members can be avoided.

In one or more embodiments, the vehicle headlamp 10 forms the so-called high-beam light distribution pattern instead of the low-beam light distribution pattern. Accordingly, the plurality of light-emitting devices 24 are respectively used to form divided light distribution patterns constituting mutually different portions of the high-beam light distribution pattern. A lighting control section for controlling the lighting of each of the light-emitting devices 24 is provided in a vehicle. The lighting control section has a CPU (central processing unit) for executing various operations, a ROM (read-only memory) for storing various control programs, and a RAM (random-access memory) that is used to store data and used as a work area for program execution.

The lighting control section obtains the data of an image taken by a CCD (charge coupled device) camera, for example, analyzes the data, and judges whether a vehicle running ahead is present. In the case that a vehicle running ahead is present, the lighting control section identifies the position of the vehicle. In order to turn off the light-emitting device 24 that forms a divided light distribution pattern containing the position at which the vehicle running ahead is present, the lighting control section issues a control signal to the light-emitting device 24. When such a control signal is input, power supply to the light-emitting module 34 is stopped to turn off the light-emitting device 24. At this time, because the control circuit section 36 is provided for each of the light-emitting modules 34 as in the configuration of the light-emitting devices 24, the lighting control for the light-emitting modules 34 can be carried out smoothly.

While description has been made in connection with specific exemplary embodiments and modified examples thereof, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF REFERENCE NUMERALS AND SIGNS 10 vehicle headlamp, 12 projection lens, 22 support member, 24 light-emitting device, 28 reflector, 28a reflecting face, 32 heat dissipating board, 32a first face, 32b convex portion, 32c second face, 32d securing concave portion, 34 light-emitting module, 36 control circuit section, 36a opposing portion, 40 light-emitting section, 42 mounting board, 44 semiconductor light-emitting element.

What is claimed is:

1. A vehicle headlamp comprising:
   a support board;
   a light-emitting module supported on the support board;
   a control circuit section supported on the support board and configured to control a lighting of the light-emitting module; and
   a reflector including a reflecting face configured to reflect and collect the light emitted from the light-emitting module,
   wherein the control circuit section includes, on at least a part of the control circuit section, an opposing portion that is opposed to the reflecting face, and the support board is configured to support the light-emitting module and the control circuit section so that the opposing portion is disposed at a position away from an optical path of light to be collected by the reflector, wherein the light-emitting module comprises a plurality of light-emitting devices, wherein the control circuit section respectively controls the lighting of each of the plurality of light-emitting devices of the light-emitting module, wherein the vehicle headlamp further comprises a charge coupled device (CCD) camera, wherein the control circuit section obtains image data taken by the CCD camera, wherein the control circuit section analyzes the image data to judge a position of any vehicle running ahead wherein, if a vehicle running ahead is present, the control circuit section respectively controls the lighting of each of the plurality of light-emitting devices of the light-emitting module based on the position of the vehicle running ahead, and wherein the control circuit section respectively controls the lighting of each of the plurality of light-emitting devices of the light-emitting module so as to turn off the light-emitting device that forms a divided light distribution pattern containing the position of the vehicle running ahead.

2. The vehicle headlamp according to claim 1, wherein the support board is made of a heat dissipating material and configured to support the light-emitting module and the control circuit section so as to recover heat generated on the light-emitting module and the control circuit section.

3. The vehicle headlamp according to claim 1, wherein the reflector comprises a plurality of reflecting faces configured so as to respectively reflect and collect light emitted from the plurality of light-emitting devices.

4. A vehicle headlamp comprising:
a support board;
a light-emitting module supported on the support board;
a control circuit section supported on the support board and configured to control a lighting of the light-emitting module; and
a reflector including a reflecting face configured to reflect and collect the light emitted from the light-emitting module,
wherein the control circuit section includes, on at least a part of the control circuit section, an opposing portion that is opposed to the reflecting face, and the support board is configured to support the light-emitting module and the control circuit section so that the opposing portion is disposed at a position away from an optical path of light to be collected by the reflector,
wherein the vehicle headlamp further comprises a support member that supports the support board,
wherein the support board is secured to the support member at a plurality of locations positioned on a straight line passing through a center of a light-emitting section of the light-emitting module so that the center of the light-emitting section is positioned between said locations,
wherein a height of a lowest portion of a light-emitting section of the light-emitting module from a support face of the support board is greater than a height of a highest portion of the opposing portion from the support face,
wherein the support board is made of a heat dissipating material and configured to support the light-emitting module and the control circuit section so as to recover heat generated by the light-emitting module and the control circuit section, wherein the vehicle headlamp further comprises a charge coupled device (CCD) camera, wherein the light-emitting module comprises a plurality of light-emitting devices, wherein the control circuit section respectively controls the lighting of each of the plurality of light-emitting devices of the light-emitting module, wherein the control circuit section obtains image data taken by the CCD camera, wherein the control circuit section analyzes the image data to judge a position of any vehicle running ahead, and wherein if a vehicle running ahead is present, the control circuit section respectively controls the lighting of each of the plurality of light-emitting devices of the light-emitting module so as to turn off the light-emitting device that forms a divided light distribution pattern containing the position of the vehicle running ahead.

5. A method of manufacturing a vehicle headlamp comprising:
providing a support board;
disposing a light-emitting module so as to be supported on the support board;
disposing a control circuit section so as to be supported on the support board and configured to control a lighting of the light-emitting module;
configuring a reflector including a reflecting face to reflect and collect light emitted from the light-emitting module, wherein the control circuit section includes, on at least a part of the control circuit section, an opposing portion that is opposed to the reflecting face; and
configuring the support board to support the light-emitting module and the control circuit section so that the opposing portion is disposed at a position away from an optical path of light to be collected by the reflector,
wherein the light-emitting module comprises a plurality of light-emitting devices,
wherein the method further comprises providing a charge coupled device (CCD) camera;
wherein the control circuit section respectively controls the lighting of each of the plurality of light-emitting devices of the light-emitting module,
wherein the control circuit section obtains image data taken by the CCD camera,
wherein the control circuit section analyzes the image data to judge a position of any vehicle running ahead, and
wherein, if a vehicle running ahead is present, the control circuit section respectively controls the lighting of each of the plurality of light-emitting devices of the light-emitting module so as to turn off the light-emitting device that forms a divided light distribution pattern containing the position of the vehicle running ahead.

6. The method according to claim 5, wherein the support board is made of a heat dissipating material and configured to support the light-emitting module and the control circuit section so as to recover heat generated by the light-emitting module and the control circuit section.

7. The method according to claim 5, further comprising:
a support member that supports the support board,
wherein the support board is secured to the support member at a plurality of locations positioned on a straight line passing through a center of a light-emitting section of the light-emitting module so that the center of the light-emitting section is positioned between said locations.

8. The method according to claim 5, further comprising:
a support member that supports the support board,
wherein the support board is secured to the support member at a plurality of locations positioned on a straight line passing through a center of a light-emitting section of the light-emitting module so that the center of the light-emitting section is positioned between said locations, wherein a height of a lowest portion of a light-emitting section of the light-emitting module from a support face of the support board is greater than a height of a highest portion of the opposing portion from the support face, and wherein the support board is made of a heat dissipating material and configured to support the light-emitting module and the control circuit section so as to recover heat generated by the light-emitting module and the control circuit section.

9. The method according to claim 5, wherein the reflector comprises a plurality of reflecting faces configured so as to respectively reflect and collect light emitted from the plurality of light-emitting devices.

* * * * *